(12) United States Patent
Augst (10) Patent No.: US 10,591,311 B2
(45) Date of Patent: Mar. 17, 2020

(54) METHOD, DEVICE, SYSTEM, AND COMPUTER PROGRAM PRODUCT FOR DISPLAYING DRIVING ROUTE SECTION FACTORS INFLUENCING A VEHICLE

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 117 days.

(21) Appl. No.: 15/461,744

(22) Filed: Mar. 17, 2017

(65) Prior Publication Data

US 2017/0191850 A1    Jul. 6, 2017

Related U.S. Application Data

(63) Continuation of application No. PCT/EP2015/068737, filed on Aug. 14, 2015.

(30) Foreign Application Priority Data

Sep. 18, 2014   (DE) .................. 10 2014 218 806

(51) Int. Cl.
*G01C 21/36* (2006.01)
*B60W 50/14* (2012.01)
(Continued)

(52) U.S. Cl.
CPC ......... *G01C 21/3697* (2013.01); *B60W 10/22* (2013.01); *B60W 50/0097* (2013.01);
(Continued)

(58) Field of Classification Search
CPC .. B60W 10/22; B60W 50/0097; B60W 50/14; B60W 2050/146; B60W 2550/146;
(Continued)

(56) References Cited

U.S. PATENT DOCUMENTS 8,915,738 B2 * 12/2014 Mannino ................ G09B 9/052
                                                             434/236
9,898,759 B2 *  2/2018 Khoury ................. G08G 1/0129
(Continued)

FOREIGN PATENT DOCUMENTS

DE    10 2012 017 932 A1    3/2013
DE    10 2012 017 118 A1    5/2014
(Continued)

OTHER PUBLICATIONS

European Search Report issued in counterpart European Application No. 17162728.4 dated Nov. 17, 2017 with partial English translation (10 pages).

(Continued)

*Primary Examiner* — Hussein Elchanti
(74) *Attorney, Agent, or Firm* — Crowell & Moring LLP (57) ABSTRACT

In a method for displaying driving route section factors influencing a vehicle, a first item of information concerning a first driving route section is determined. A second item of information concerning a second driving route section is determined. Depending on the first item of information, at least one first set of parameters that is representative of at least one factor of the first driving route section influencing the vehicle is determined. Depending on the second item of information, at least one second set of parameters that is representative of at least one factor of the second driving route section influencing the vehicle is determined. Depending on the at least one first set of parameters and the at least one second set of parameters, a display that represents an influencing factor of the first driving route section and an influencing factor of the second driving route section, in particular with reference to a predefined reference variable, is produced.

12 Claims, 1 Drawing Sheet

(51) Int. Cl.
*B60W 50/00* (2006.01)
*B60W 10/22* (2006.01)

(52) U.S. Cl.
CPC ....... B60W 50/14 (2013.01); *B60W 2050/146* (2013.01); *B60W 2550/146* (2013.01); *B60W 2550/147* (2013.01); *B60W 2550/40* (2013.01); *G01C 21/365* (2013.01); *G01C 21/3635* (2013.01)

(58) Field of Classification Search
CPC ........ B60W 2550/147; B60W 2550/40; G01C 21/3635; G01C 21/365
See application file for complete search history.

(56) References Cited

U.S. PATENT DOCUMENTS

| | | | |
|---|---|---|---|
| 2009/0164063 A1 | 6/2009 | Piccinini et al. | |
| 2009/0234552 A1* | 9/2009 | Takeda | B60W 30/16 701/96 |
| 2010/0020170 A1* | 1/2010 | Higgins-Luthman | B60Q 1/1423 348/135 |
| 2011/0301806 A1* | 12/2011 | Messier | G01C 21/3469 701/423 |
| 2012/0174111 A1* | 7/2012 | Pala | G06F 3/011 718/102 |
| 2012/0191343 A1* | 7/2012 | Haleem | G01C 21/3697 701/431 |
| 2012/0203428 A1 | 8/2012 | Choi et al. | |
| 2012/0232741 A1* | 9/2012 | Sekiyama | G07C 5/0808 701/29.1 |
| 2013/0226622 A1* | 8/2013 | Adamson | G06Q 40/08 705/4 |
| 2013/0311081 A1* | 11/2013 | Yamakawa | G01C 21/00 701/428 |
| 2015/0223024 A1* | 8/2015 | Abuodeh | H04W 4/02 455/456.3 |
| 2015/0266455 A1* | 9/2015 | Wilson | G09B 19/10 701/93 |
| 2015/0314663 A1* | 11/2015 | Rhode | B60G 17/0165 701/37 |
| 2015/0353095 A1 | 12/2015 | Freess | |
| 2018/0086347 A1* | 3/2018 | Shaikh | B60W 40/09 |
| 2018/0089605 A1* | 3/2018 | Poornachandran | G06Q 30/0282 |

FOREIGN PATENT DOCUMENTS

| | | |
|---|---|---|
| GB | 2492896 A | 1/2013 |
| GB | 2494528 A | 3/2013 |
| WO | WO 2014/108556 A1 | 7/2014 |

OTHER PUBLICATIONS

International Search Report (PCT/ISA/210) issued in PCT Application No. PCT/EP2015/068737 dated Oct. 20, 2015 with English translation (seven pages).
German-language Written Opinion (PCT/ISA/237) issued in PCT Application No. PCT/EP2015/068737 dated Oct. 20, 2015 (seven pages).
German Search Report issued in counterpart German Application No. 10 2014 218 806.7 dated Apr. 14, 2016 with partial English translation (12 pages).

* cited by examiner

METHOD, DEVICE, SYSTEM, AND COMPUTER PROGRAM PRODUCT FOR DISPLAYING DRIVING ROUTE SECTION FACTORS INFLUENCING A VEHICLE

CROSS REFERENCE TO RELATED APPLICATIONS

This application is a continuation of PCT International Application No. PCT/EP2015/068737, filed Aug. 14, 2015, which claims priority under 35 U.S.C. § 119 from German Patent Application No. 10 2014 218 806.7, filed Sep. 18, 2014, the entire disclosures of which are herein expressly incorporated by reference.

BACKGROUND AND SUMMARY OF THE INVENTION

The invention relates to a method for displaying driving route section factors influencing a vehicle. The invention also relates to a device and a system for displaying driving route section factors influencing a vehicle. The invention further relates to a computer program and a computer program product for displaying driving route section factors influencing a vehicle.

Present-day vehicles are increasingly being equipped with display screens, or increasingly modern display screens, on which many items of information can be displayed.

The object on which the invention is based is to provide a method and a corresponding device that contribute to transmitting information contents intuitively to a vehicle driver.

This and other objects are achieved by a method and a device for displaying driving route section factors influencing a vehicle in accordance with embodiments of the invention.

The invention is distinguished by a method for displaying driving route section factors influencing a vehicle. The invention is further distinguished by a device that corresponds to the method. A first item of information concerning a first driving route section is determined. A second item of information concerning a second driving route section is determined. Depending on the first item of information, at least one first set of parameters, which is representative of at least one factor of the first driving route section influencing the vehicle, is determined. Depending on the second item of information, at least one second set of parameters, which is representative of at least one factor of the second driving route section influencing the vehicle, is determined. Depending on the at least one first set of parameters and the at least one second set of parameters, a display that represents an influencing factor of the first driving route section and an influencing factor of the second driving route section, in particular with reference to a predefined reference variable, is produced.

Furthermore, according to the invention, at least one parameter of the first set of parameters and/or of the second set of parameters is determined depending on data that are representative of how the vehicle responds to predefined physical roadway characteristics. Such data may for example represent a function that represents a reproduction of the accelerations acting on the vehicle on the passenger compartment or seats of the vehicle. This may be a function, in particular a system-theoretical function, that is an overall representation of the vehicle or of a specific characteristic of the vehicle, in particular the characteristic of responding to acceleration effects or transmitting such effects for example from the wheels to the seats or steering wheel. The data may also represent specific characteristics of mechanical, hydraulic and/or mechatronic systems of the vehicle, in particular system-theoretically. This may also involve taking into consideration for example which vertical-dynamic frequencies can be damped and how well by electronic vehicle systems.

According to an advantageous refinement, the first and second sets of parameters are determined depending on the current loading, on the current seat occupancy and/or the current axle load distribution of the vehicle.

The characteristics of the vehicle may in this case be permanent characteristics and/or the current state or an expected state of a variable characteristic.

Preferably, the first and/or second driving route section may relate to an upcoming, in particular possible, route for the vehicle. Particularly preferred as driving route sections are such driving route sections that can be driven by the vehicle in the next driving minutes or hours, that is to say in particular driving routes that relate to the future. At least one of the driving route sections may also alternatively or additionally relate to the near future of, for example, less than 5 seconds, 20 seconds or 45 seconds. In this case, the corresponding driving route section may concern the current path guiding horizon known to a person skilled in the art, in particular a driving route section that extends up to 200 meters into the area surrounding the vehicle. Driving route sections may for example have an extent of less than 10 meters, 100 meters, 1 kilometer or 10 kilometers. They may also concern one or more specific lanes of a road or a freely accessible off-road area, for example also a concrete stretch within a freely accessible off-road area that extends in two directions.

The first item of information and the second item of information may comprise coordinate data that are representative of a driving route section or a relatively great area of the driving route to which the driving route section belongs. The driving route may comprise the course of the driving route in the form of coordinates and/or characteristics of the driving route.

A set of parameters may consist of one or more parameters. A parameter may for example represent a value, an assignment table and/or a mathematical function. A set of parameters may be determined depending on the information, in particular by one or more parameters being retrieved on the basis of the information from a memory, a database or a server. The set of parameters may also be determined according to predetermined mathematical relationships by data processing means.

In the case of an advantageous development of the method, the method may be applied simultaneously to a number of driving route sections, for example three, four or more. One effect of this is to give the driver of the vehicle the possibility of selecting an option that is best suited with regard to specific influences on the vehicle.

The vehicle that is influenced by the driving route section during driving may be for example an actual vehicle or for example a statistical reference vehicle with statistically averaged characteristics. Particularly preferably, the vehicle to which the influencing factors relate is a vehicle of the same class as the vehicle in which the display is shown. Most particularly preferably, the influencing factors relate to the vehicle in which the display is produced.

The display is advantageously a graphical representation or a sequence of graphical representations produced or shown within the vehicle, for example an animated graphic, an animation or a video sequence. The display may be produced on an information display of the vehicle, in the so-called instrument cluster, in the so-called head-up display or on a screen that is connected to the vehicle or located in the vehicle. The display may be of a two-dimensionally or three-dimensionally perceptible design.

The method presented provides a vehicle driver with a good overview of influencing factors of a number of sections of the road. This allows the vehicle driver to see easily whether one route is for example bumpier than another route and then deliberately decide in favor of one of the two. If, for example, the driver wants to look after the vehicle, he may choose the less bumpy route. If he deliberately wishes to choose a bumpier route, he may also do so. Furthermore, he may choose a route according to his preference without making a misjudgement.

Furthermore, the method allows an uncomplicated and particularly intuitive transmission of information contents to the driver or occupants of the vehicle. Such information also allows the expectation of a driving experience on a chosen driving route to coincide very well with the driving experience that actually happens there. This is made possible even without the driver being familiar with complex matters of how the vehicle is influenced by different conditions of the roadway. A further advantage is obtained for example when transporting sensitive goods and/or sleeping children and the like.

The reference to the reference variable provides the driver with even more intuitive information, since he can consequently compare the route section with, for example, route sections that have already been driven.

According to an advantageous refinement, the first set of parameters and the second set of parameters are determined depending on at least one physical roadway characteristic of the respective driving route section, preferably depending on a specific combination of different roadway characteristics of the respective driving route sections.

Preferably, the first set of parameters and the second set of parameters are determined in dependence on substantially the same and/or an appropriately adapted physical roadway characteristic. The influencing factors may be physical, in particular mechanical, influencing factors, for example force effects or vibrations, in particular of a specific kind and/or amplitude and/or of a specific amplitude curve and/or forces curve, and the like.

Advantageously, the first set of parameters and/or the second set of parameters is in each case determined depending on a specific combination of different roadway characteristics of the respective driving route sections, at least one or two parameters being representative of the same influencing factors, for example specific physical roadway characteristics.

According to an advantageous refinement, at least one parameter of the first set of parameters and/or at least one parameter of the second set of parameters represent a vertical-dynamic influence on the vehicle, in particular of the vertical-dynamic acceleration influences acting on the passenger compartment of the vehicle.

Vertical-dynamic accelerations comprise here for example rolling accelerations and/or pitching accelerations, and/or lifting accelerations. Particularly preferably, the first set of parameters and/or the second set of parameters in this case represents a combination of the values that are dependent on accelerations of this kind, preferably objectively dependent.

The first and/or second set of parameters may in this case represent a statistical value, which for example represents specific vertical-dynamic influences on the vehicle, preferably with reference to at least two different frequency ranges, in particular spatial frequency ranges.

The method may in this case comprise a step for determining a vertical-dynamic influence on the vehicle, for example also from database information. Such a vertical-dynamic influence may, in dependence on the roadway characteristics determined, comprise an influence or a number of influences of these characteristics on a vehicle or the vehicle.

Influences may in this case be, for example, physical acceleration influences and/or relate to one or more speed values, for example specific reference speed values, with which the driving route is driven by a vehicle. For example, the influences may be determined for 1-5 different speed values that are typical of the driving route section, such as for example 30 km/h, 50, km/h, 60 km/h, 120 km/h, 180 km/h. Such reference speed values may be chosen in dependence on the type of road or depending on actual statistical values that concern the driving route. Consequently, the number of values to be determined can be reduced and more suitable parameters determined.

The determining of one or more parameters that has/have a significant dependence on vertical-dynamic accelerations from the information concerning a driving sections is particularly advantageous because, by such parameters, a measure of an off-road driving experience can also be represented. As a person skilled in the art knows, an off-road driving experience with typical or specific accelerations acting on the vehicle and the driver may often be explicitly desired or explicitly undesired. It may also be that only a specific off-road driving experience, for example only relatively low frequencies with an amplitude limited to a specific value, is desired. As a result, such an off-road driving experience can be represented very clearly for the driver of the vehicle by the display, with reference to two or more driving route sections that the vehicle will or can drive in the near future.

According to an advantageous refinement, the first set of parameters and the second set of parameters are in each case determined from a predefined combination of the roadway characteristics that belong to different classes of roadway characteristics.

Such specific combinations of roadway characteristics may for example also be optimized in advance, on the basis of a number of, in themselves, relatively abstract wishes. Such wishes comprise for example looking after the vehicle as much as possible and/or reducing accelerations acting on the driver or occupants (transversal accelerations, pitching accelerations, rolling accelerations, etc.) and/or vibrations and/or a specific driving experience and/or a desired combination of these influencing factors.

When selecting combinations of the influencing factors, it is also possible to determine weighting factors that determine a measure of the consideration for at least two different influencing factors when determining the corresponding parameter.

It is consequently possible by use of the method and the corresponding vehicle to satisfy a specific objective or subjective wish of a vehicle driver for a specific driving experience, feel of the vehicle, for example a choice of route that is suitable or optimum for this.

According to an advantageous refinement, one class of roadway characteristics concerns permanent physical roadway unevennesses.

The permanent physical roadway unevennesses include in particular vertical roadway irregularities substantially in the longitudinal direction and/or substantially in the transverse direction, in particular in a first spatial frequency range and/or in a second spatial frequency range.

The permanent physical roadway unevennesses alternatively or additionally include a presence of at least one predefined unevenness pattern of the roadway, at least one quantitative measure for an unevenness pattern of the roadway, and/or a relative weighting of a number of patterns of the kind predefined.

An unevenness pattern may be a roadway undulation, a pothole, a gap, for example occurring regularly, between the concrete slabs, a lane groove, etc. A quantitative measure may be chosen in dependence on a geometrical measure, for example the depth, height, form factor and/or frequency of the unevenness pattern.

The permanent physical roadway unevennesses alternatively or additionally comprise in particular a measure of transversal accelerations that act on a vehicle or the vehicle when driving over the driving route section with reference to one or more speeds or in a form that is normalized to a speed value.

If, for example, the driver is driving for many hours, for example on vacation with children, or if a truck driver has to transport sensitive goods, in both cases the drivers want to minimize the transversal accelerations acting, at least in relation to the driving speed, in order for example not to wake the children and/or not to damage the goods.

According to an advantageous refinement, one class of roadway characteristics concerns physical acceleration influences on the vehicle or another vehicle, in particular vertical-dynamic acceleration influences on the vehicle in the longitudinal direction and/or substantially in the transverse direction that are to be expected on the vehicle or another vehicle with reference to one or more driving speeds in a first frequency range and/or in a second frequency range.

The frequency ranges include in particular spatial frequency ranges. The spatial frequency range of a driving route relates in particular to the undulation of the roadway with reference to the undulation with a specific extent in the longitudinal or transverse direction. The spatial frequency range is determined in particular by means of a time-discrete Fourier analysis, in particular by means of a Fourier transformation. Fourier transformation is the collective term used here to refer to a method of Fourier analysis that allows continuous, aperiodic signals to be broken down into a continuous spectrum. The function that describes this spectrum is also referred to as a Fourier transform or spectral function. The determination of the spatial frequency range substantially comprises the forming of a spectral function, preferably with discrete forms of Fourier analysis, for example by means of a fast Fourier transformation (FFT), a cosine transformation and/or a modified discrete cosine transformation (MDCT), resolved on the basis of a location, or on the basis of an item of information that represents the location.

Particularly preferably, this involves at least two different spatial frequency ranges of the driving route or spatial frequency ranges with reference to the vehicle being driven, because the driving experience perceived by the vehicle occupants is strongly dependent on these. A first frequency range may for example be approximately 0.2-30 Hz. Such a range is often greatly favored by drivers of off-road vehicles on account of a specific kinesthetic experience associated with it. A second frequency range may be for example approximately 20 Hz-350 Hz. This in turn involves vibrations, which are perceived by the auditory system and also directly physically. Frequencies from this range produce for the occupants of the vehicle an experience that is clearly distinguishable from that of frequencies from the first range.

Consequently, the driver can estimate on the basis of the display which of the two (off-road) driving routes that are for example available for selection is the best for him. The display can in this case be made graphically very clear and illustrate the corresponding parameters concerning a driving route, for example that has already been experienced, in a juxtaposition, so that the driver can compare a predicted experience concerning a first driving route and a second driving route with an experience that has already been had. Consequently, the driver does not have to concern himself with less meaningful absolute values and does not necessarily have to be familiar with the frequency ranges.

According to an advantageous refinement, the display represents an influencing factor of the first driving route section and an influencing factor of the second driving route section with reference to a predefined reference variable. The reference variable is determined depending on an item of information that is representative of at least one influencing factor of a driving route section that has already been driven in the past or is currently being driven by the driver of the vehicle and/or by the vehicle.

Particularly preferably, the reference variable includes a historical value, in particular with reference to the vehicle and/or the driver of the vehicle. It may for example be a historical value of a respective parameter. In this case, the historical value may relate in particular to the last less than 50, 100, 1000 km, and/or to the driving routes of the same kind (for example freeways, federal highways, country roads, country lanes, off-road routes), in particular those that are contained in a navigation map as the same class of driving routes.

In this case, the values collected by the driver when driving other vehicles may be transferred into the vehicle according to the invention, for example together with other personal settings.

The reference variable may also relate to a current, in particular measured, value of the parameter.

A reference value that is chosen in this way or can be chosen by the driver allows the driver to compare the determined forecast, represented in the display for one or two alternative driving route sections available for selection with a value experienced by him. If, for example, the road is too bumpy for him, he can look for a road that is at least 30% less bumpy.

According to an advantageous refinement, the first set of parameters and/or the second set of parameters include at least two parameters that are determined depending on at least two of the following influencing factors of the driving route section: at least one statistical value, at least one qualitative value concerning the kind of influencing factor, and/or at least one course value of the influencing factor with reference to driving time or position.

Advantageously, the statistical parameter of the first or second set of parameters may represent an accumulation of a physical roadway characteristic that preferably belongs to a specific class of roadway characteristics, in particular over the course of the first or second driving route section.

The at least one qualitative value gives an indication of the kind of physical roadway characteristic and/or the kind of influence on the vehicle.

The course value may represent a variation of the influencing variable over the course of the driving route section, for example also a distribution value. Advantageously, the course value may represent a variation tendency of the respective influencing variable, for example rising, falling, distributing characteristics, etc. This value may be taken into consideration when determining the first and/or second influencing factor. It is also possible in association with respectively different course values of the influencing variables to determine or take into consideration course values of the interactions between two or more parameters within the respective driving route section.

In this case, the display may also include the influencing factors of the first driving route section and the influencing factors of the second driving route section in dependence on the determined course values of the interactions between these two parameters of respective sets of parameters within respective driving route sections.

According to an advantageous refinement, for the display, a graphical representation is produced by an assignment or conversion on the basis of a predefined formula of the parameters of the first and/or second set of parameters to or into graphical elements.

In this case, the display may be made up from the graphical elements determined in such a way. The graphical elements may be prefabricated elements already stored in the memory, such as so-called bitmaps. The display may alternatively or additionally also be produced by means known per se of simulation or mathematical modeling.

Particularly preferably, this represents the juxtaposition of a first set of parameters and a second set of parameters and a reference variable in relation to one another, the reference variable preferably representing a statistical value that matches up with one of the influencing variables.

A further significant part of the method presented relates to a representation of at least two factors influencing the vehicle in a symbolic form. In this case, the display preferably comprises a symbolic depiction of the vehicle and/or of one or more influencing factors.

Particularly preferably, the appearance of the symbolic depiction, in particular the displayed symbols or the appearance of a vehicle represented in this way, changes in dependence on the influencing factors determined.

In this case, the method may include a further step, in which a number of graphics, which represent a different state of the vehicle, are represented for one or more influencing factors. In this case, the state of the vehicle may be a deformation of the vehicle in one or more sages.

According to an advantageous refinement, for the display, at least one statistical value is represented by means of variation of a symbolic representation of the vehicle and/or at least one qualitative value concerning the kind of influencing factor is represented by means of variation of a further symbolic representation of the vehicle and/or at least one course value of a parameter is represented by means of a curve, in particular a symbolic curve, on the basis of the driving time or on the basis of the driving route.

Particularly preferably, the display may include a symbolic representation of the vehicle, one part of the display showing the state of the vehicle in dependence on the influencing variables of the first driving route section and another part showing the vehicle in dependence on the second driving route section. The state of the vehicle may comprise a symbolic and/or imagined form. An exaggerated representation is particularly preferred, which means that, after driving the route, the vehicle does not necessarily have to appear as it is represented in the display.

The display may include a number of graphics or variants of a graphic that represent a modification of the symbolically represented vehicle depending on the determined sets of parameters, which symbolize the required characteristics of the vehicle to drive the driving route.

Alternatively or additionally, the display may also represent one or more diagrams, in particular generated in a further step of the method. These may provide a visual presentation of a statistical value and/or a course value of one or more influencing factors in a graphical form. Alternatively or additionally, the display may also include numerical values.

According to an advantageous refinement, the first and second driving route sections include in each case a part of at least two alternative routes of the vehicle, the alternative routes preferably relating to the same destination or intermediate destination.

According to an advantageous refinement, the first driving route section and the second driving route section include at least partially parts of a predefined vehicle route.

Preferably, the driving route sections may be for example successive, in particular directly successive, driving route sections. Alternatively, the driving route sections may be selected, for example particularly critical driving route sections of a route.

According to an advantageous refinement, the first item of information and/or the second item of information are determined in dependence on provision of a destination of a navigation system operated in the vehicle, provision of a navigation map, and/or provision of data that are provided by a server outside the vehicle, in particular including retrieval of the data in dependence on at least one item of information concerning the destination or an item of information from a navigation map.

According to an advantageous refinement, the first item of information and/or the second item of information are determined in dependence on a probability calculation concerning the route of the vehicle, in particular with respect to the probability concerning the selection of the first driving route section and the second driving route section.

Within the method it may be determined from the probability information which driving route sections are driven with which probability. This may be determined on the basis of a determined or estimated probability concerning turning-off directions, entry and exit points, junctions, rotary intersection exit points, etc., that the vehicle will take. The probability values may also be determined from statistical values with reference to the vehicle or a number of vehicles.

According to an advantageous refinement, an item of information concerning at least one measure that changes the respective factor influencing the vehicle, in particular in a specific way or to a predetermined extent, is determined depending on at least one parameter of the first set of parameters and/or the second set of parameters. The method also includes one of the following steps: visually presenting an item of information concerning the measure and visually presenting an operating action by the driver that leads to the measure, and/or an activation of the measure by means of the vehicle and visually presenting an item of information for the driver concerning this activation, preferably in the display.

In this case, the measure may for example be proposed, automatically implemented or prepared for an implementation in association with the display.

According to an advantageous refinement, the measure includes one or more changeover options for the chassis and suspension of the vehicle and/or for a driver assistance system of the vehicle, in the case of a number of options a respective determined or estimated effect preferably being represented.

For example, it may be displayed which effect it would have if a chassis and suspension are set to be more rigid or flexible, higher or lower. It may also be displayed for example which effect changing over to all-wheel drive or a number of available variants of all-wheel drive would have, and the like.

For example, it may be displayed which effect it would have if a driver assistance system which outputs information, in particular warnings or recommendations for action, for example with respect to path guidance of the vehicle, to the driver and/or intervenes in the longitudinal dynamics or transverse dynamics of the vehicle, were changed over to one or more changeover options, in particular other changeover options than the one that is currently active.

For example, the sensitivity or a response of a driver assistance system to specific influencing factors may in this case be changed.

This may for example involve displaying by use of symbols which effect changing over to at least two available changeover options of the vehicle assistance system would have in each case.

According to an advantageous refinement, data concerning the condition of the roadway are determined by use of one or more perceptive sensors of the vehicle. The first item of information concerning the first driving route section and/or the second item of information concerning the second driving route section and/or the reference variable are determined in dependence on the data.

Particularly preferably, at least one reference variable is determined in this way. Consequently, the driver of the vehicle can compare by way of the display the at least two predicted sets of parameters for the first and second driving route sections with the current value of the respective set of parameters that represents a current influencing factor. In this case, the driver can for example decide whether he prefers, or is willing to accept, a more extreme off-road driving experience than currently.

According to an advantageous refinement, a vehicle profile that is representative of the vehicle is provided. At least one parameter of the first set of parameters and/or of the second set of parameters is determined depending on the vehicle profile.

In this case, the first set of parameters and/or the second set of parameters may be determined depending on one or more characteristics of the vehicle, in particular with reference to the characteristics that directly or indirectly concern the off-road capability of the vehicle.

According to an advantageous refinement, a person profile that is assigned to at least one vehicle occupant is provided. At least one parameter of the first set of parameters and/or of the second set of parameters are determined depending on the person profile and/or depending on a number of person profiles if a number of person profiles are provided.

A person profile may for example be representative of the personal sensitivity of a person to specific influencing factors or personal preferences concerning specific influencing factors. It is for example known that different persons are differently sensitive to various vertical-dynamic acceleration influences and transverse-dynamic acceleration influences or vibrations. Consequently, these differences can also be taken into consideration.

According to an advantageous refinement, at least one parameter of the first set of parameters and/or of the second set of parameters is compared with a predefined highest value. If the value is greater than the highest value, an item of information concerning at least one possible measure is determined, and/or changeover data concerning changing, in particular automatically changing, a vehicle setting are determined.

The device may also be formed as a portable device. The device is consequently formed for example in a portable navigation system, smartphone and/or Tablet PC. The portable device may preferably be designed for:
- determining data by way of an interface from the vehicle electrical system, and/or
- determining data from a navigation map or an external database, and/or
- determining at least one person profile and/or vehicle profile.

According to a further aspect, the invention is distinguished by a system which includes the portable device, a vehicle and a data processing device, in particular remote from the vehicle. The portable device is designed to exchange data with the vehicle and the data processing device. The portable device is designed to perform the method for displaying drive route section factors influencing a vehicle and/or an advantageous refinement of the method for displaying driving route section factors influencing a vehicle with the vehicle and/or the data processing device.

According to a further aspect, the invention is distinguished by a computer program, the computer program being designed to carry out the method for displaying driving route section factors influencing a vehicle and/or an advantageous refinement of the method for displaying driving route section factors influencing a vehicle on a data processing device.

According to a further aspect, the invention is distinguished by a computer program product which includes executable program code, the program code when executed by a data processing device performing the method for displaying driving route section factors influencing a vehicle and/or an advantageous refinement of the method for displaying driving route section factors influencing a vehicle.

The computer program product includes in particular a medium which can be read by the data processing device and on which the program code is stored.

Within the scope of the invention, the vehicle is preferably a motor vehicle or a motorcycle. This gives rise to a number of advantages discussed above and a number of further advantages discernible to a person skilled in the art.

Such a vehicle may also be an agricultural vehicle, for example a combine harvester or harvesting machine, two specific areas of a field that can be worked or movement trajectories within a field corresponding to a first driving route section and a second driving route section. Furthermore, the vehicle may also be a watercraft, part of the seabed and/or of the layers of water corresponding to the driving route. The vehicle may also be an aircraft, a first driving route and a second driving route respectively corresponding to a first flying route and a second flying route. In particular, in this case a first flying corridor corresponds to a first driving route section and a second flying corridor corresponds to a second driving route section.

In an alternative variant of the invention, the vehicle may also be a construction vehicle or a machine designed for earth movements, drilling, mineral extraction or part of such a machine, layers of the ground corresponding to the driving route. A first driving route section may in this case correspond to a first movement of the part of the machine, for example the drilling head or a milling cutter of a machine, through layers of earth, and the second driving route section may correspond to a second movement of the implement of the machine through layers of earth.

Other objects, advantages and novel features of the present invention will become apparent from the following detailed description of one or more preferred embodiments when considered in conjunction with the accompanying drawing.

DETAILED DESCRIPTION OF THE DRAWING

Figure 1:
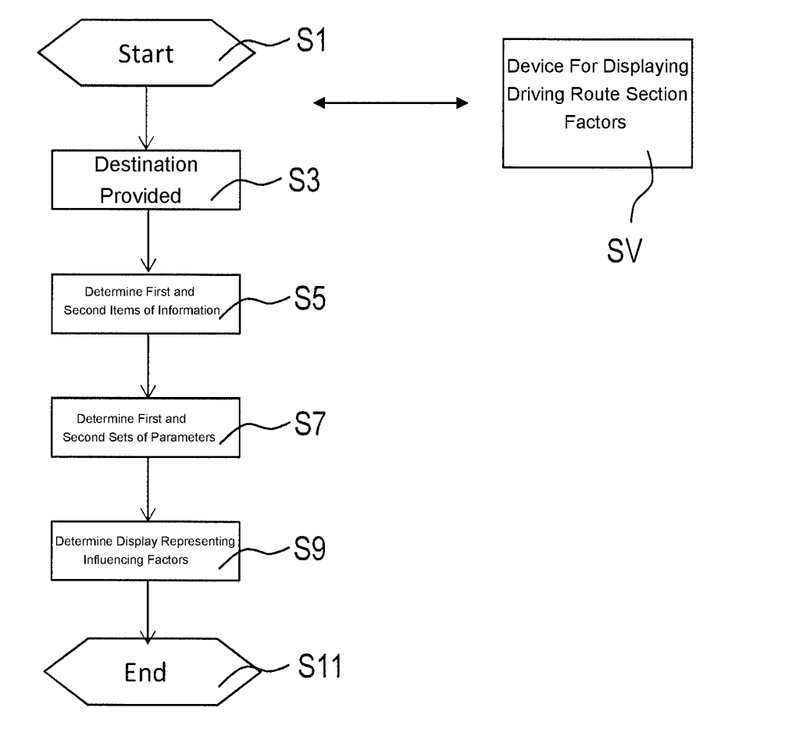
FIG. 1 is a flow diagram of a program for displaying driving route section factors influencing a vehicle in accordance with an embodiment of the invention.

FIG. 1 shows a flow diagram of a program for displaying driving route section factors influencing a vehicle.

The program may be run for example by way of a device SV, which has in particular at least one computing unit, a program and data memory and, for example, one or more communication interfaces and which is arranged for example in a vehicle. The program and data memory and the computing unit of the device SV may be formed in one structural unit and/or in a manner distributed among a number of structural units. The device SV may also be formed as a portable device.

The portable device is for example designed to exchange data with the vehicle and a data processing device, which is in particular arranged remote from the vehicle.

The program may for example alternatively or additionally be run in a distributed manner on the device SV, in particular the portable device, the vehicle and/or the data processing device.

The device SV may also be referred to as a device for displaying driving route section factors influencing a vehicle.

The program is started in a step S1, in which for example variables are initialized.

In a step S3, a destination of a navigation system operated in the vehicle is provided. Alternatively or additionally, a navigation map is provided. Alternatively or additionally, data that are provided by a server outside the vehicle are provided. In particular, these data are retrieved in dependence on at least one item of information concerning the destination or an item of information from a navigation map.

In a step S5, a first item of information concerning a first driving route section and a second item of information concerning a second driving route section are determined, in particular depending on the information provided in the step S3, that is to say the destination and/or the navigation map and/or the data.

The first and second driving route sections may for example substantially coincide. Alternatively, the first and second driving route sections differ at least partially.

The first driving route section and the second driving route section include for example at least partially parts of a predefined vehicle route.

The first item of information and/or the second item of information are for example determined in dependence on a probability calculation concerning a route of the vehicle, in particular with respect to the probability concerning the selection of the first driving route section and the second driving route section.

Alternatively or additionally, data concerning the condition of the roadway are determined by way of one or more perceptive sensors of the vehicle and the first item of information concerning the first driving route section and/or the second item of information concerning the second driving route section are determined in dependence on the data.

In a step S7, at least one first set of parameters, which is representative of at least one factor influencing the vehicle, for example a physical roadway characteristic, is determined depending on the first item of information. In addition, at least one second set of parameters, which is representative of at least one factor influencing the vehicle, for example a physical roadway characteristic, is determined depending on the second item of information. If the first and second driving route sections substantially coincide, the respective influencing factor for which the respective sets of parameters are representative differs. If the first and second driving route sections do not coincide, the respective influencing factor for which the respective sets of parameters are representative may differ or alternatively be the same.

In addition, in step S7, a reference variable may be determined, in particular depending on an item of information that is representative of at least one influencing factor of a driving route section that has already been driven in the past or is currently being driven by the driver of the vehicle and/or by the vehicle.

The first set of parameters and the second set of parameters may for example be determined depending on at least one physical roadway characteristic of the respective driving route section. These may in each case include a number of values of the physical roadway characteristic within the driving route or a driving route section or a function that represents a progression of the corresponding values.

This results in one particular advantage, that a progression of the interactions between different influencing factors can also be determined and represented in the display.

Alternatively or additionally, a vehicle profile that is representative of the vehicle may be provided and at least one parameter of the first set of parameters and/or of the second set of parameters may be determined depending on the vehicle profile.

Alternatively or additionally, a parameter of the first set of parameters and/or of the second set of parameters may be determined depending on data that are representative of how the vehicle responds to predefined physical roadway characteristics.

Alternatively or additionally, the first and second set of parameters are for example determined depending on the current loading, on the current seat occupancy and/or the current solar distribution of the vehicle.

A loading of the vehicle may significantly influence the sensitivity of the vehicle to specific influencing factors, particularly resonant frequencies of the vehicle. The loading itself may also have very differing sensitivity to specific influencing factors. Such a sensitivity may manifest itself particularly significantly in the case of hazardous goods.

Taking into consideration the loading, in particular a loading profile (analogous to a person profile), the influencing factors that are relevant to driving the first and second driving routes can be better compared by means of the display.

Alternatively or additionally, a person profile that is assigned to at least one vehicle occupant is provided and at least one parameter of the first set of parameters and/or of the second set of parameters is determined depending on the person profile.

At least one parameter of the first set of parameters and/or at least one parameter of the second set of parameters represent for example a vertical-dynamic influence on the vehicle.

The first set of parameters and the second set of parameters are for example in each case determined from a predefined combination of the roadway characteristics that are associated with different classes of roadway characteristics.

One class of roadway characteristics concerns for example permanent physical roadway unevennesses.

One class of roadway characteristics concerns for example physical acceleration influences on the vehicle or on another vehicle.

The first set of parameters and/or the second set of parameters include for example at least two parameters that are determined depending on at least two of the following influencing factors of the driving route section:
   at least one statistical value, and/or
   at least one qualitative value concerning the kind of influencing factor, and/or
   at least one course value of the influencing factor with reference to the driving time or position.

In a step S9, depending on the at least one first set of parameters and the at least one second set of parameters, a display that represents an influencing factor of the first driving route section and an influencing factor of the second driving route section is determined. In addition, the display may also represent an influencing factor of the first driving route section and an influencing factor of the second driving route section with reference to the predefined reference variable.

For the display, a graphical representation is produced by an assignment or conversion on the basis of a predefined formula of the parameters of the first and/or second set of parameters to or into graphical elements.

For the display, for example at least one statistical value is represented by means of variation of a symbolic representation of the vehicle and/or at least one qualitative value concerning the kind of influencing factor is represented by means of variation of a further symbolic representation of the vehicle and/or at least one course value of a parameter is represented by means of a curve on the basis of the driving time or on the basis of the driving route.

The display according to the invention may also be designed as a comparative presentation, which represents a comparison of at least one influencing factor of the first driving route section with at least one influencing factor of the second driving route section. In this case, a relationship between the respective influencing factors of the same kind or corresponding kinds can be established, preferably by graphical means.

Alternatively or additionally, in the method a difference between an influencing factor of the first driving route section and the influencing factor of the second driving route section may be determined and the display produced in dependence on the difference determined.

Such a display may represent the difference determined or a highlighting of the difference determined. The difference may comprise additive and/or a multiplicative and/or logarithmic components.

The display may for example represent an absolute difference, a percentage difference or the logarithmic relationship between at least two influencing factors that is particularly significant for human perception.

The difference determined may in this case be normalized to a distance unit, in particular the length of the driving route section. The difference determined may also be normalized to a time unit or to the driving time.

Consequently, the differences, preferably highlighted in the display, can be registered by the user "at a glance". The highlighting of the differences may in this case take place by graphical means, for example varying the colors, sizes, lines, etc.

In a step S11, the program has ended and, if required, can be started again in the step S1.

Alternatively or additionally, an item of information concerning at least one measure that changes the respective factor influencing the vehicle, in particular in a specific way or to a predetermined extent, can be determined depending on at least one parameter of the first set of parameters and/or the second set of parameters. This may for example be followed additionally by an item of information concerning the measure determined being visually presented, an operating action by the driver that leads to the measure being visually presented, and/or the measure being activated by means of the vehicle and an item of information for the driver concerning this activation being visually presented.

The measure includes for example one or more changeover options for the chassis and suspension of the vehicle and/or for a driver assistance system of the vehicle.

Alternatively or additionally, at least one parameter of the first set of parameters and/or of the second set of parameters may be compared with a predefined highest value and, if the value is greater than the highest value, an item of information concerning at least one possible measure is determined, and/or changeover data concerning changing a vehicle setting are determined.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for displaying driving route section factors influencing a vehicle, the method comprising the acts of:
   determining a first item of information concerning a first driving route section and a second item of information concerning a second driving route section;
   depending on the first item of information, determining at least one first set of parameters, which is representative of at least one factor of the first driving route section influencing the vehicle;
   depending on the second item of information, determining at least one second set of parameters, which is representative of at least one factor of the second driving route section influencing the vehicle;
   displaying a graphical representation of an influencing factor of the first driving route section and an influencing factor of the second driving route section depending on the at least one first set of parameters and the at least one second set of parameters, wherein the graphical representation comprises a comparative presentation of the influencing factor of the first driving route and the influencing factor of the second driving route; and
   determining a first parameter of the first set of parameters and/or of the second set of parameters depending on data that are representative of how the vehicle mechanically responds to predefined physical roadway characteristics,
   wherein a second parameter of the first set of parameters and/or of the second set of parameters represents a vertical-dynamic influence on the vehicle, the vertical-dynamic influence reflecting how the vehicle mechanically responds in a vertical direction to predefined physical roadway characteristics.

2. The method as claimed in claim 1, wherein the graphical representation represents an influencing factor of the first driving route section and an influencing factor of the second driving route section with reference to a predefined reference variable, which is determined depending on an item of information that is representative of at least one influencing factor of a driving route section that has already been driven in the past or is currently being driven by a driver of the vehicle and/or by the vehicle.

3. The method as claimed in claim 1, wherein
the first set of parameters and/or the second set of parameters comprise at least two parameters that are determined depending on at least two of the following influencing factors of the driving route section:
at least one statistical value,
at least one qualitative value concerning a kind of influencing factor, or
at least one course value of the influencing factor with reference to driving time or position.

4. The method as claimed in claim 1, wherein the graphical representation is produced by an assignment or conversion on the basis of a predefined formula of the parameters of the first and/or second set of parameters to or into graphical elements.

5. The method as claimed in claim 1, wherein for the display:
(i) at least one statistical value is represented by way of variation of a symbolic representation of the vehicle,
(ii) at least one qualitative value concerning a kind of influencing factor is represented by way of variation of a further symbolic representation of the vehicle, and/or
(iii) at least one course value of a parameter is represented by way of a curve on the basis of driving time or on the basis of driving route.

6. The method as claimed in claim 1, wherein the first driving route section and the second driving route section comprise at least partially parts of a predefined vehicle route.

7. The method as claimed in claim 1, wherein
an item of information concerning at least one measure that changes the respective factor influencing the vehicle is determined depending on at least one parameter of the first set of parameters and/or the second set of parameters,
the method further comprising at least one of the following steps:
visually presenting an item of information concerning the measure,
visually presenting an operating action by a driver that leads to the measure, and
activating of the measure by the vehicle and visually presenting an item of information for the driver concerning this activation.

8. The method as claimed in claim 1, wherein
a vehicle profile that is representative of the vehicle is provided, and
at least one parameter of the first set of parameters and/or of the second set of parameters is determined depending on the vehicle profile.

9. The method as claimed in claim 1, wherein at least one of the first set of parameters for the first driving route section and at least one of the second set of parameters for the second driving route section are representative of a same physical roadway characteristic.

10. A device for displaying driving route section factors influencing a vehicle, the device comprising:

a computing unit;
a data memory; and
a program stored in the data memory, wherein the computing unit is configured to execute the program to:
determine a first item of information concerning a first driving route section and a second item of information concerning a second driving route section,
depending on the first item of information, determine at least one first set of parameters that is representative of at least one factor of the first driving route section influencing the vehicle,
depending on the second item of information, determine at least one second set of parameters that is representative of at least one factor of the second driving route section influencing the vehicle,
display a graphical representation of an influencing factor of the first driving route section and an influencing factor of the second driving route section depending on the at least one first set of parameters and the at least one second set of parameters, wherein the graphical representation comprises a comparative presentation of the influencing factor of the first driving route and the influencing factor of the second driving route, and
determine a first parameter of the first set of parameters and/or of the second set of parameters depending on data that are representative of how the vehicle mechanically responds to predefined physical roadway characteristic,
wherein a second parameter of the first set of parameters and/or of the second set of parameters represents a vertical-dynamic influence on the vehicle, the vertical-dynamic influence reflecting how the vehicle mechanically responds in a vertical direction to predefined physical roadway characteristics.

11. A system, comprising:
a portable device;
a vehicle; and
a data processing device, wherein the portable device is designed to exchange data with the vehicle and the data processing device, and the portable device together with the vehicle and/or the data processing device, are configured to:
determine a first item of information concerning a first driving route section and a second item of information concerning a second driving route section;
depending on the first item of information, determine at least one first set of parameters, which is representative of at least one factor of the first driving route section influencing the vehicle;
depending on the second item of information, determine at least one second set of parameters, which is representative of at least one factor of the second driving route section influencing the vehicle;
display a graphical representation of an influencing factor of the first driving route section and an influencing factor of the second driving route section depending on the at least one first set of parameters and the at least one second set of parameters, wherein the graphical representation comprises a comparative presentation of the influencing factor of the first driving route and the influencing factor of the second driving route; and
determine a first parameter of the first set of parameters and/or of the second set of parameters depending on data that are representative of how the vehicle mechanically responds to predefined physical roadway characteristics, wherein a second parameter of the first set of parameters and/or of the second set of parameters represent a vertical-dynamic influence on the vehicle, the vertical-dynamic influence reflecting how the vehicle mechanically responds in a vertical direction to predefined physical roadway characteristics.

12. A computer program product comprising a non-transitory computer readable medium having stored thereon executable program code, wherein the program code when executed by a data processing device:

determines a first item of information concerning a first driving route section and a second item of information concerning a second driving route section;

depending on the first item of information, determines at least one first set of parameters, which is representative of at least one factor of the first driving route section influencing the vehicle;

depending on the second item of information, determines at least one second set of parameters, which is representative of at least one factor of the second driving route section influencing the vehicle;

displaying a graphical representation of an influencing factor of the first driving route section and an influencing factor of the second driving route section depending on the at least one first set of parameters and the at least one second set of parameters, wherein the graphical representation comprises a comparative presentation of the influencing factor of the first driving route and the influencing factor of the second driving route; and determining a first parameter of the first set of parameters and/or of the second set of parameters depending on data that are representative of how the vehicle mechanically responds to predefined physical roadway characteristics, wherein a second parameter of the first set of parameters and/or of the second set of parameters represents a vertical-dynamic influence on the vehicle, the vertical-dynamic influence reflecting how the vehicle mechanically responds in a vertical direction to predefined physical roadway characteristics.

\* \* \* \* \*